(12) United States Patent
Cho et al.

(10) Patent No.: US 8,743,846 B2
(45) Date of Patent: Jun. 3, 2014

(54) METHOD FOR TRANSMITTING SERVICE FLOW INFORMATION IN A WIRELESS COMMUNICATION SYSTEM

(75) Inventors: Hee Jeong Cho, Anyang-si (KR); Ki Seon Ryu, Anyang-si (KR); Young Soo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 424 days.

(21) Appl. No.: 13/147,566

(22) PCT Filed: Jan. 29, 2010

(86) PCT No.: PCT/KR2010/000553
§ 371 (c)(1),
(2), (4) Date: Aug. 2, 2011

(87) PCT Pub. No.: WO2010/090416
PCT Pub. Date: Aug. 12, 2010

(65) Prior Publication Data
US 2011/0286419 A1    Nov. 24, 2011

Related U.S. Application Data

(60) Provisional application No. 61/149,343, filed on Feb. 3, 2009.

(30) Foreign Application Priority Data

Dec. 10, 2009    (KR) ........................ 10-2009-0122387

(51) Int. Cl.
*H04W 74/08*    (2009.01)
*H04W 28/10*    (2009.01)

(52) U.S. Cl.
USPC .......................................... 370/336

(58) Field of Classification Search
USPC .......................................... 370/336
See application file for complete search history.

(56) References Cited

U.S. PATENT DOCUMENTS 5,493,569 A    2/1996  Buchholz et al.
7,548,534 B2   6/2009  Zimmerman et al.
(Continued)

FOREIGN PATENT DOCUMENTS

CN    1882159 A      12/2006
CN    101155395 A    4/2008
(Continued)

OTHER PUBLICATIONS

Cho et al., "Differentiated Random Access Scheme for Bandwidth Request in IEEE802.16m Systems," IEEE 802.16 Broadband Wireless Access Working Group <http://ieee802.org/16>, IEEE C802.16m-08/970, Sep. 5, 2008, pp. 1-4.

(Continued)

*Primary Examiner* — Melvin Marcelo
(74) *Attorney, Agent, or Firm* — Birch, Stewart, Kolasch & Birch, LLP

(57) ABSTRACT

The present invention relates to a method for transmitting service flow information in a wireless communication system. The method for transmitting service flow information in a wireless communication system according to one aspect of the present invention comprises the step of enabling a terminal to transmit, to a base station and through the service flow to be generated or modified during a service flow generating or modifying process, an indicator for indicating whether or not uplink data to be transmitted exists.

9 Claims, 13 Drawing Sheets

(56) References Cited

U.S. PATENT DOCUMENTS

| | | | |
|---|---|---|---|
| 7,676,230 B2 | 3/2010 | Kang et al. | |
| 8,031,666 B2 | 10/2011 | Jeon et al. | |
| 2003/0124976 A1 | 7/2003 | Tamaki et al. | |
| 2004/0008658 A1 | 1/2004 | Dahlman et al. | |
| 2005/0054389 A1 | 3/2005 | Lee et al. | |
| 2005/0063330 A1 | 3/2005 | Lee et al. | |
| 2006/0050742 A1 | 3/2006 | Grandhi et al. | |
| 2006/0159015 A1* | 7/2006 | Seo et al. | 370/229 |
| 2006/0203712 A1 | 9/2006 | Lim et al. | |
| 2006/0239241 A1 | 10/2006 | Eom et al. | |
| 2006/0245352 A1 | 11/2006 | Kang et al. | |
| 2007/0104141 A1 | 5/2007 | Park et al. | |
| 2007/0201399 A1 | 8/2007 | Lee et al. | |
| 2007/0206531 A1 | 9/2007 | Pajukoski et al. | |
| 2007/0206561 A1 | 9/2007 | Son et al. | |
| 2008/0171553 A1 | 7/2008 | Ren et al. | |
| 2009/0068944 A1 | 3/2009 | Kang et al. | |
| 2009/0109915 A1 | 4/2009 | Pasad et al. | |
| 2009/0137254 A1* | 5/2009 | Vukovic et al. | 455/452.1 |
| 2010/0111029 A1 | 5/2010 | Chou et al. | |
| 2010/0265896 A1 | 10/2010 | Park et al. | |
| 2011/0176516 A1* | 7/2011 | Thakore et al. | 370/335 |
| 2011/0286420 A1 | 11/2011 | Cho et al. | |
| 2012/0026873 A1 | 2/2012 | Spinar et al. | |

FOREIGN PATENT DOCUMENTS

| | | |
|---|---|---|
| CN | 101207535 A | 6/2008 |
| CN | 101400144 A | 4/2009 |
| CN | 100546415 A | 9/2009 |
| CN | 102144426 A | 8/2011 |
| EP | 1 940 185 A1 | 7/2008 |
| JP | 8-500227 A | 1/1996 |
| JP | 9-83544 A | 3/1997 |
| JP | 2002-527967 A | 8/2002 |
| JP | 2006-135441 A | 5/2006 |
| JP | 2008-510380 A | 4/2008 |
| JP | 2008-295014 A | 12/2008 |
| KR | 10-2005-0029112 A | 3/2005 |
| KR | 10-2005-0052124 A | 6/2005 |
| KR | 10-2006-0083935 A | 7/2006 |
| KR | 10-0703303 B1 | 4/2007 |
| KR | 10-2007-0048552 A | 5/2007 |
| KR | 10-0975699 | 5/2007 |
| KR | 10-2007-0065549 A | 6/2007 |
| KR | 10-2008-0043471 A | 5/2008 |
| KR | 10-2008-0054987 A | 6/2008 |
| KR | 10-2008-0063594 A | 7/2008 |
| KR | 10-2009-0028443 A | 3/2009 |
| KR | 10-0937432 | 3/2009 |
| TW | 354286 U1 | 4/2009 |
| WO | WO 2008/082908 A | 7/2008 |
| WO | 2008/096627 A1 | 8/2008 |
| WO | 2008/115699 A1 | 9/2008 |
| WO | 2008/155931 A1 | 12/2008 |
| WO | 2009/035905 A2 | 3/2009 |

OTHER PUBLICATIONS

Okuda et al., "Consecutive Transmission of Bandwidth Request Indicators," IEEE 802.16 Broadband Wireless Access Working Group, http://ieee802.org/16>, IEEE C802.16m-08/963, Sep. 5, 2008, pp. 1-4.

Zhu et al., "Proposed Text Changes to the IEEE 802.16m SDD (802.16m-08/003r6), Section 11.9.2.5 on the Bandwidth Request Channel," IEEE 802.16 Broadband Wireless Access Working Group, http://ieee8092.org/16>, IEEE C802.16m-09/0151, Jan. 5, 2009, 1-8.

* cited by examiner

METHOD FOR TRANSMITTING SERVICE FLOW INFORMATION IN A WIRELESS COMMUNICATION SYSTEM

This application is the National Phase of PCT/KR2010/000553 filed on Jan. 29, 2010, which claims priority under 35 U.S.C. 119(e) to U.S. Provisional Application Nos. 61/149,343 filed on Feb. 3, 2009 and under 35 U.S.C. 119(a) to Patent Application No. KR 10-2009-0122387 filed in the Republic of Korea on Dec. 10, 2009, all of which are hereby expressly incorporated by reference into the present application.

FIELD OF THE INVENTION

The present invention relates to a wireless communication system and, most particularly to a method for transmitting service flow information in a wireless communication system.

BACKGROUND ART

First of all, a related art service flow generation procedure in a wireless communication system will be described. The service flow generation may start from a base station or may start from a user equipment.

FIG. 1(a) illustrates a case when a service flow generation starts from a base station, and FIG. 1(b) illustrates a case when a service flow generation starts from a user equipment.

As shown in FIG. 1(a), in case the service flow generation starts from the base station, when the base station transmits a dynamic service addition request (hereinafter referred to as "DSA-REQ") message to the user equipment, the user equipment transmits a dynamic service addition response (hereinafter referred to as "DSA-RSP") message to the base station. Thereafter, the base station transmits a dynamic service addition acknowledgement (hereinafter referred to as "DSA-ACK") message to the user equipment. At this point, the DSA-REQ includes a service flow ID and a QoS (Quality of Service) parameter set with respect to an uplink or downlink service flow.

As shown in FIG. 1(b), in case the service flow generation starts from the user equipment, when the user equipment transmits a DSA-REQ message to the base station, the base station transmits a DSA-RSP message to the user equipment. Thereafter, the user equipment transmits a DSA-ACK message to the base station. At this point, the DSA-REQ includes a QoS parameter set.

Additionally, the user equipment or the base station may change the QoS parameter set of the service flow through a dynamic service change request (hereinafter referred to as "DSC-REQ") message and a dynamic service change response (hereinafter referred to as "DSC-RSP") message.

A QoS parameter set associated with uplink data will now be described.

Table 1 shows QoS parameter sets when the uplink data correspond to Real-time constant bit-rate data streams, such as a UGS (Unsolicited Grant Service).

TABLE 1

| Parameter | Meaning |
| --- | --- |
| Tolerated Jiter | As in 11. 13.13 |
| If (Fixed length SDU){ | |
| SDU size | As in 11. 13.16 |
| } | |
| Minimum reserved traffic rate | As in 11. 13.8 |
| Maximum Latency | As in 11. 13.14 |

TABLE 1-continued

| Parameter | Meaning |
| --- | --- |
| Request/Transmission Policy | As in 11. 13.12 |
| If(UL service flow) { | |
| Grant Scheduling Type | UGS as specified in 6.3.5.2.1 |
| Unsolicited Grant Interval | As in 11. 13.20 |
| } | |

Table 2 shows QoS parameter sets when the uplink data correspond to Real-time semi-variable bit-rate data streams, such as an ertPS (extended real-time Polling Service).

TABLE 2

| Parameter | Meaning |
| --- | --- |
| Maximum Latency | As specified in 11. 13.14 |
| Tolerated Jiter | As specified in 11. 13.13 |
| Minimum reserved traffic rate | As specified in 11. 13.8 |
| Maximum Sustained traffic rate | As specified in 11. 13.6 |
| Traffic Priority | As specified in 11. 13.5 |
| Request/Transmission Policy | As specified in 11. 13.12 |
| Unsolicited Interval | As specified in 11. 13.20 |

In Table 1 and Table 2, the Unsolicited Grant Interval field indicates an interval between continuous resource grant (or allocation) for the service flow. Such granted (or allocated) resource is used for data transmission.

Table 3 shows QoS parameter sets when the uplink data correspond to Real-time variable bit-rate data streams.

TABLE 3

| Parameter | Meaning |
| --- | --- |
| Maximum Latency | As in 11. 13.14 |
| Minimum Reserved traffic rate | As in 11. 13.8 |
| Maximum Sustained traffic rate | As in 11. 13.6 |
| Traffic Priority | As in 11. 13.5 |
| Request/Transmission Policy | As in 11. 13.12 |
| If(UL service flow) { | |
| Scheduling Type | rtPS as in 6.3.5.2.2 |
| Unsolicited Scheduling Interval | As in 11. 13.21 |
| } | |

In Table 3, the Unsolicited polling interval field indicates a maximum interval between resource grant (or allocation) for the service flow. Such granted (or allocated) resource is used for uplink resource request transmission.

Table 4 shows QoS parameter sets when the uplink data correspond to Delay-tolerant variable bit-rate data streams.

TABLE 4

| Parameter | Meaning |
| --- | --- |
| Minimum Reserved traffic rate | As in 11. 13.8 |
| Maximum Sustained traffic rate | As in 11. 13.16 |
| Traffic Priority | As in 11. 13.5 |
| c | As in 11. 13.12 |
| If(UL service flow) { | |
| Scheduling Type | nrtPS as in 6.3.5.2.3 |
| } | |

Table 5 shows QoS parameter sets when the uplink data correspond to BE (best effort) data streams.

TABLE 5

| Parameter | Meaning |
| --- | --- |
| Maximum Sustained traffic rate | Optional. As in 11.13.8 |
| Maximum Sustained traffic rate | As in 11. 13.12 |
| If(UL service flow) { | |
|     Scheduling Type | BE as in 6.3.5.2.4 |
| } | |

As shown in Table 1 to Table 5, the QoS parameter set included in the DSA-REQ does not include information on a resource grant starting point. More specifically, only the information on resource grant intervals exists, and the information on a point where the user equipment starts to request a resource grant and a point where the base station starts to allow the resource grant does not exist. Therefore, according to the related art, after a service flow is generated or corrected, the user equipment waits until the base station allocates (or grants) resource or performs a contention based resource grant request. Accordingly, during this process, a packet transmission delay and a packet loss may occur.

DETAILED DESCRIPTION OF THE INVENTION

Technical Objects

As described above, according to the related art, since the base station and the user equipment do not exchange information on the resource grant starting point during the service flow generation or correction process, the user equipment is required to separately perform a process step of an uplink resource request in addition to the process step of service flow generation or modification (or correction). And, accordingly, a problem of packet transmission delay and packet loss may occur.

An object of the present invention is to provide a method for transmitting service flow information that can reduce packet transmission delay and packet loss.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

In order to achieve the technical objects of the present invention, according to an aspect of the present invention, a method of transmitting service flow information at a mobile station (MS) in a wireless communication system, the MS may transmit an indicator to a base station during a process of generating or modifying a service flow, the indicator indicating whether or not uplink data that are to be transmitted through a service flow, which is to be generated or modified, exist.

At this point, in case the indicator indicates that uplink data that are to be transmitted through the service flow, which is to be generated or modified, exist, the MS may transmit a resource allocation request starting point that corresponds to a point at which the user equipment requests the base station for a resource allocation.

Also, the indicator and the resource allocation request starting point may be transmitted through a MAC message, the MAC message being transmitted during the process of generating or modifying a service flow.

Also, the MAC message may further include a size of the resource requested by the user equipment to be allocated.

Also, the resource allocation request starting point may correspond to an offset starting from a specific reference point to a point at which the user equipment requests for a resource allocation.

Also, the user equipment may be granted with an uplink resource from the base station at a time point apart from the specific reference point as much as the offset.

Also, the resource allocation request starting point may correspond to a subframe, frame, or superframe number to which the user equipment requests for the resource grant.

Furthermore, in case the base station is incapable of allocating a resource to the user equipment at the resource allocation request starting point, the user equipment may receive a resource allocation acceptance starting point, which corresponds to a point at which the base station is capable of allocating resource to the user equipment.

In order to achieve the technical objects of the present invention, according to another aspect of the present invention, a method of receiving service flow information at a base station (BS) in a wireless communication system, a base station may receive an indicator from a user equipment during a process of generating or modifying a service flow, the indicator indicating whether or not uplink data that are to be transmitted through a service flow, which is to be generated or modified, exist, and a resource allocation request starting point, which corresponds to a point where the user equipment requests the base station for a resource allocation.

At this point, in case the base station is incapable of allocating a resource to the user equipment at the resource allocation request starting point, the base station may receive a resource allocation acceptance starting point, which corresponds to a point at which the base station is capable of allocating resource to the user equipment.

Effects of the Invention

According to the present invention, during the process of generating or modifying a service flow, by having the user equipment transmit an indicator indicating whether or not uplink data that are to be transmitted through the service flow, which is to be generated or modified, exist and also transmit a starting point at which the user equipment requests the base station to grant (or allocate) resources, packet transmission delay and packet loss may be reduced.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BEST MODE FOR CARRYING OUT THE PRESENT INVENTION

Figure 1:
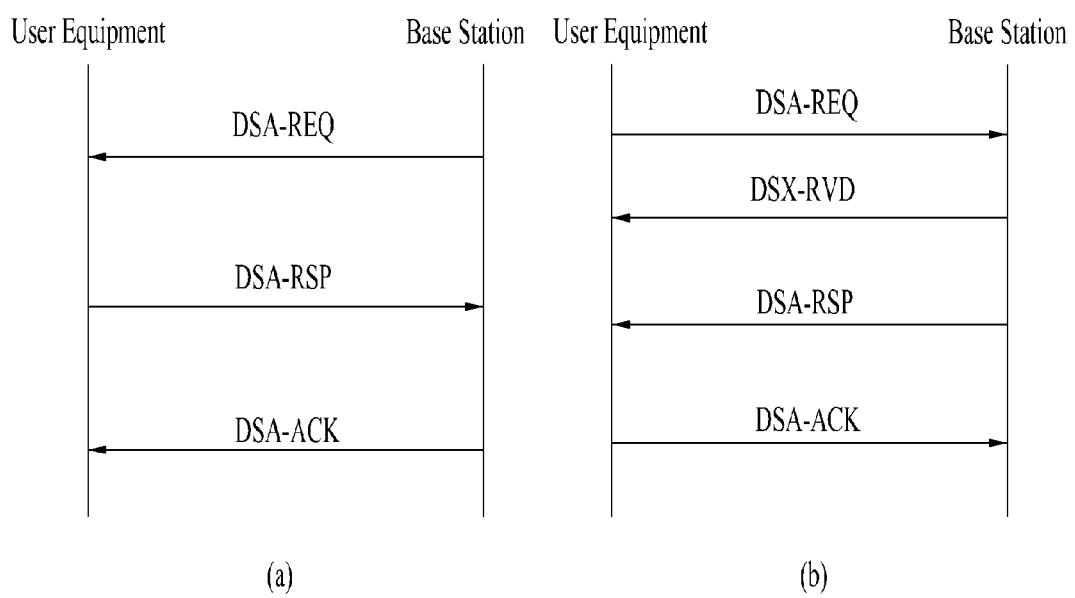
FIG. 1(a) illustrates a case when a service flow generation starts from a base station.
FIG. 1(b) illustrates a case when a service flow generation starts from a user equipment.

Hereinafter, the preferred embodiments of the present invention will now be described in detail with reference to the accompanying drawings. The detailed description of the present invention that is to be disclosed along with the appended drawings is merely given to provide to describe the exemplary embodiment of the present invention. In other words, the embodiments presented in this specification do not correspond to the only embodiments that can be realized according to the present invention. In the following description of the present invention, the description of detailed features of the present invention will be given in order to provide a full and complete understanding of the present invention. However, it will be apparent to those skilled in the art that the present invention can be realized even without the detailed features described herein. For example, the present invention will be described in detail as follows based upon an assumption that the mobile communication system used in the present invention corresponds to a 3GPP2 802.16 system. However, with the exception for the unique features of the 3GPP2 802.16 system, other mobile communication systems may also be randomly applied in the present invention.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Furthermore, throughout the entire description of the present invention, the same reference numerals will be used for the same elements of the present invention.

Furthermore, in the following description of the present invention, it will be assumed that the term user equipment is used to collectively refer to a mobile or fixed user-end device, such as a UE (User Equipment), an MS (Mobile Station), and so on. Additionally, it will also be assumed that the term base station is used to collectively refer to a random node of a network end communicating with the user equipment, such as Node B, eNode B, Base Station, and so on.

A method for transmitting service flow information in a wireless mobile communication system according to the present invention will now be described in detail with reference to the accompanying drawings.

According to the embodiment of the present invention, the user equipment may transmit an indicator indicating whether or not uplink data that are to be transmitted through the service flow exist to the base station. At this point, a resource grant request starting point and/or a request size may also be transmitted along with the indicator. Alternatively, the base station may also notify the user equipment of a resource grant acceptance starting point.

According to the embodiment of the present invention, an indicator indicating whether or not uplink data that are to be transmitted through the service flow exist is referred to as an uplink data transmission indicator. However, the term will not be limited only to this, and, therefore, the indicator may also be referred to as a different term. For example, in case the uplink data that are to be transmitted through the service flow, which is to be generated or modified, exist, the user equipment may set up the uplink data transmission indicator to and, in case the uplink data that are to be transmitted through the service flow, which is to be generated or modified, do not exist, the user equipment may set up the uplink data transmission indicator to '0'.

The resource grant request starting point transmitted by the user equipment or the resource grant acceptance starting point transmitted by the base station may be defined by an offset, frame number, subframe number, or superframe number.

In case the service type is UGS or ertPS, the user equipment may transmit only the uplink data transmission indicator to the base station or may transmit the uplink data transmission indicator and the resource grant request stating point to the base station. And, in case the service type corresponds to a type other than UGS or ertPS, the user equipment may transmit the uplink data transmission indicator, the resource allocation request stating point, and the resource allocation request size to the base station.

First of all, the case when the user equipment transmits only the uplink data transmission indicator to the base station will be described.

In case the uplink data that are to be transmitted through the service flow, which is to be generated or modified, exist, the user equipment sets up the uplink data transmission indicator to '1' and transmits the uplink data transmission indicator to the base station. At this point, the user equipment may transmit the uplink data transmission indicator through a MAC message (DSx MAC message), which is transmitted during the generation or modification of the service flow, or through a dedicated resource, or by using a piggybacking method. Examples of the DSx MAC message includes a dynamic service addition request (hereinafter referred to as "DSA-REQ"), a dynamic service addition response (hereinafter referred to as "DSA-RSP"), a dynamic service addition acknowledgement (hereinafter referred to as "DSA-ACK"), a dynamic service change request (hereinafter referred to as "DSC-REQ"), a dynamic service change response (hereinafter referred to as "DSC-RSP), a dynamic service change acknowledgement (hereinafter referred to as "DSC-ACK"), and so on. Also, a dedicated resource includes a fast feedback channel and a dedicated bandwidth request channel (dedicated BR channel). Furthermore, an example of the piggybacking method includes a transmission method through an extended header.

After receiving the uplink data transmission indicator, which is set to '1', in case a resource size agreed upon between the user equipment and the base station, such as UGS and ertPS, exists, the base station grants (or allocates) a resource size corresponding to the agreed resource size to the user equipment.

On the other hand, in case the agreed resource size does not exist, the base station allocates a resource size required for transmitting bandwidth request (BR) information to the user equipment. Accordingly, the user equipment transmit BR information to the base station based upon the received granted resource, and the base station allocates uplink resource to the user equipment based upon the received BR information.

Hereinafter, the case when the user equipment transmits the uplink data transmission indicator and the resource allocation request starting point to the base station will now be described.

The user equipment may notify the base station of the resource allocation request starting point through an offset starting from a specific reference point, and the user equipment may also notify the base station of the initiation (or starting point) of the resource allocation by using a frame, subframe, or superframe number.

Figure 2:
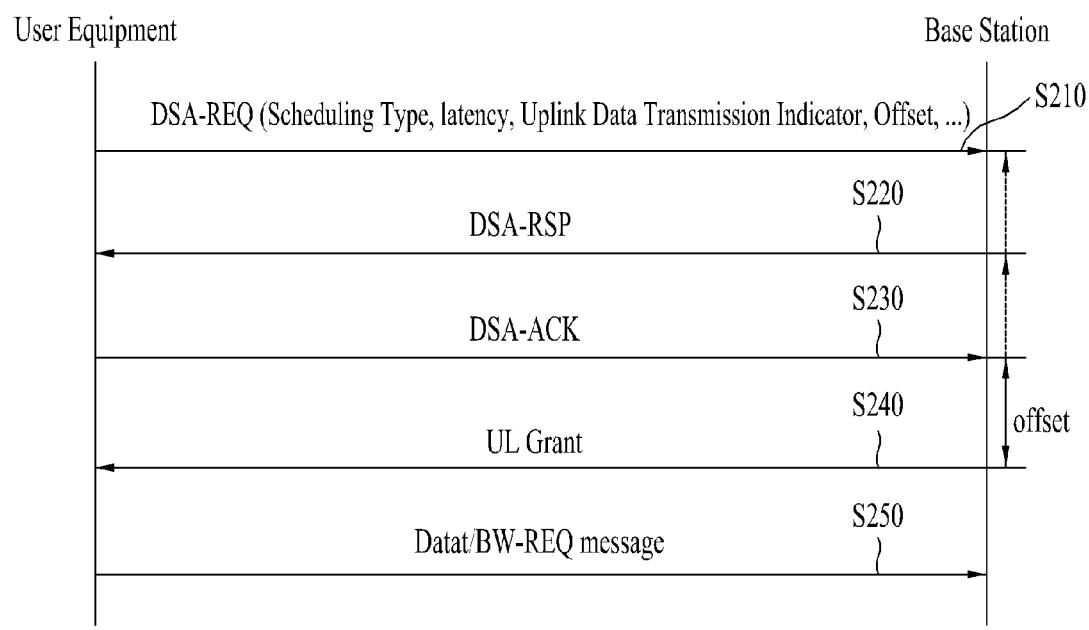
FIG. 2 illustrates an example of the user equipment transmitting an uplink data transmission indicator and a resource grant request starting point through a MAC message.
Figure 3:
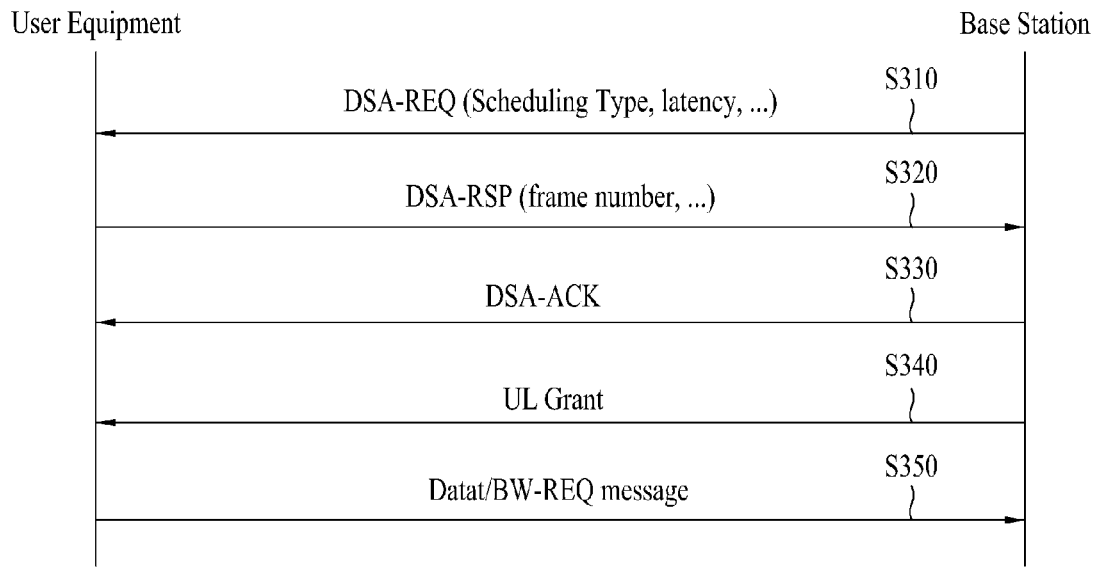
FIG. 3 illustrates another example of the user equipment transmitting an uplink data transmission indicator and a resource grant request starting point through a MAC message.

FIG. 2 illustrates an example of the user equipment transmitting an uplink data transmission indicator and a resource allocation request starting point through a MAC message, and FIG. 3 illustrates another example of the user equipment transmitting an uplink data transmission indicator and a resource allocation request starting point through a MAC message.

FIG. 2 illustrates a case when the user equipment notifies the base station of the resource allocation request starting point through an offset starting from a specific reference point.

As shown in FIG. 2, the user equipment transmits a DSA-REQ message including an uplink data transmission indicator and a resource allocation request starting point to the base station (S210). The user equipment may transmit the resource allocation request starting point only when the uplink data transmission indicator is equal to 1.

In case the user equipment transmits the resource allocation request starting point through the offset, this indicates that the user equipment requests the base station to allocate the resource starting from a time point apart from the reference point as much as the offset. At this point, the specific reference point may correspond to the point when the base station has received the DSA-REQ message, the time point when the base station has transmitted the DSA-RSP message, the time point when the base station has received the DSA-ACK message, or the time point when the base station has last allowed the offset.

If the base station can allocate a resource at a resource allocation request starting point of the user equipment, the base station may use a MAC message or the piggybacking method so as to transmit a resource allocation acceptance starting point identical to the received resource allocation request point, or the base station may not transmit the resource grant acceptance starting point.

If resource is allowed to be granted at the resource grant acceptance starting point of the user equipment, the user equipment may transmit an identical resource grant request starting point or the user equipment may not transmit a resource allocation request starting point.

Furthermore, if the base station cannot allocate a resource at the resource allocation request starting point of the user equipment, the base station uses the MAC message or the piggybacking method, so as to transmit a resource allocation acceptance starting point at which the base station can allocate the resource to the user equipment.

The point at which the base station has last allowed an offset may signify a point at which the base station has transmitted the resource allocation acceptance starting point to the user equipment, the resource allocation acceptance starting point corresponding to a point at which the base station may transmit a resource allocation acceptance starting point identical to the received resource allocation request starting point, or to a point at which the base station can allocate the resource.

Referring to FIG. 2, the base station transmits a DSA-RSP message to the user equipment (S220). At this point, if the base station cannot allocate a resource to the user equipment of the requested resource allocation request starting point, the DSA-RSP message may include a resource allocation acceptance starting point, which corresponds to a point at which the base station can allocate the resource.

Thereafter, the user equipment transmits a DSA-ACK message to the base station as an acknowledgement (or verification) response to the DSA-RSP message (S230).

The base station allocates uplink resource to the user equipment at a time point apart from the reference point as much as the offset (S240). In case a resource size agreed upon between the user equipment and the base station, such as UGS and ertPS, exists, the base station allocates (or allocates) a resource size corresponding to the agreed resource size to the user equipment.

Also, in case the agreed resource size does not exist, the base station allocates a resource size required for transmitting bandwidth request (BR) information to the user equipment. Accordingly, the user equipment transmit BR information to the base station based upon the received granted resource, and the base station allocates uplink resource to the user equipment based upon the received BR information.

Furthermore, in case an unsolicited grant interval or an unsolicited polling interval exists, the base station may allocate resource to the user equipment starting from a time point apart from the reference point as much as the offset for each unsolicited grant interval or unsolicited polling interval.

The user equipment transmits data or a bandwidth request message (BW-REQ message) to the base station through the allocated uplink resource (S250).

FIG. 3 shows a case when the user equipment notifies a resource grant request starting point to the base station by using a frame number. And, FIG. 3 also shows a case when the base stations starts the service flow generation.

As shown in FIG. 3, the base station transmits a DSA-REQ message to the user equipment in order to generate a service flow (S310).

Then, the user equipment transmits a DSA-RSP message including the resource grant request starting point to the base station (S320).

In case the user equipment transmits the resource allocation request starting point by using a subframe number, a frame number, or a superframe number, the user equipment requests the base station to allocate resource in the corresponding subframe, frame, or superframe.

At this point, if the subframe number, frame number, or superframe number received by the base station corresponds to a past number or the current number, the base station may recognize the resource grant as an immediate request.

The base station transmits a DSA-ACK message to the user equipment as an acknowledgement (or verification) response to the DSA-RSP message (S330). At this point, in case the base station cannot allocate resource to the user equipment at the resource allocation request starting point requested by the user equipment, the DSA-ACK message may include a resource grant acceptance starting point, which corresponds to a point at which the base station can allocate the resource.

Then, the base station allocates uplink resource to the user equipment at the resource allocation request starting point requested by the user equipment nor the resource allocation acceptance starting point transmitted by the base station (S340). In case a resource size agreed upon between the user equipment and the base station, such as UGS and ertPS, exists, the base station grants (or allocates) a resource size corresponding to the agreed resource size to the user equipment.

Also, in case the agreed resource size does not exist, the base station allocates a resource size required for transmitting bandwidth request (BR) information to the user equipment. Accordingly, the user equipment transmit BR information to the base station based upon the received allocated resource, and the base station allocates uplink resource to the user equipment based upon the received BR information.

Furthermore, in case an unsolicited grant interval or an unsolicited polling interval exists, the base station may allocate resource to the user equipment starting from a reference point (subframe, frame, or superframe number to which the resource is granted) for each unsolicited grant interval or unsolicited polling interval.

The user equipment transmits data or a bandwidth request message (BW-REQ message) to the base station through the allocated uplink resource (S350).

Hereinafter, a case when the user equipment notifies the base station that uplink data that are to be transmitted exist through a dedicated bandwidth request channel will now be described with reference to FIG. 4.

Figure 4:
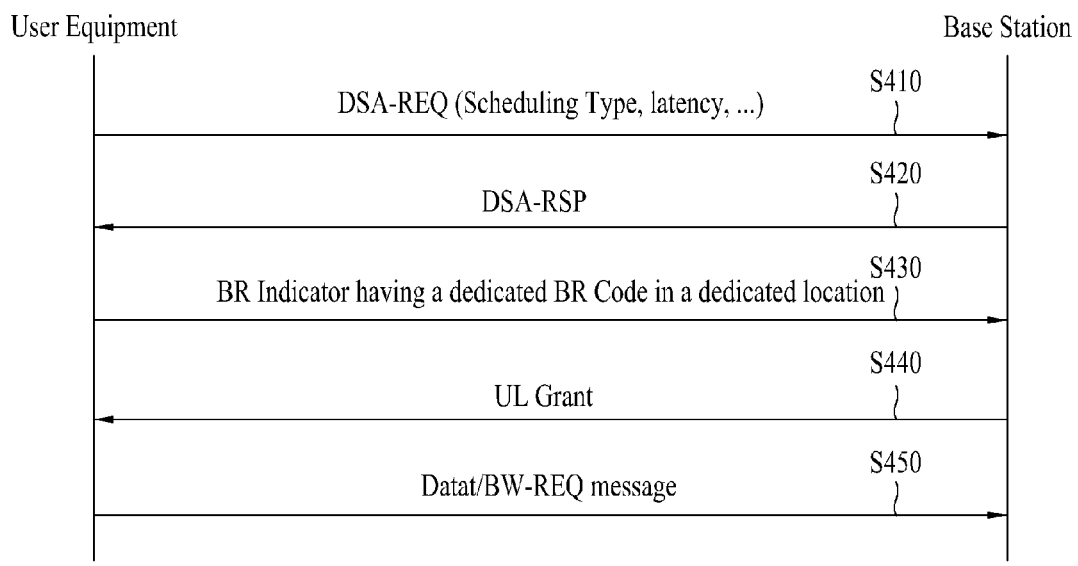
FIG. 4 illustrates an example of the user equipment notifying the base station of the presence of uplink data that are to be transmitted through a dedicated bandwidth request channel.

FIG. 4 illustrates an example of the user equipment notifying the base station of the presence of uplink data that are to be transmitted through a dedicated bandwidth request channel.

The user equipment may notify the existence of uplink data that are to be transmitted through a generated or modified (or changed) service flow to the base station by using a dedicated resource or a piggybacking method. The dedicated resource includes a fast feedback channel and a dedicated bandwidth request channel (dedicated BR channel), and an example of the piggybacking method includes a transmission method through an extended header.

As shown in FIG. 4, in order to generate a service flow, the user equipment transmits a DSA-REQ message to the base station (S410), and the base station transmits a DSA-RSP message to the user equipment (S420).

Thereafter, in order to notify the base station of the existence of uplink data that are to be transmitted through the generated service flow, the user equipment transmits a bandwidth indicator (BW indicator) having a dedicated bandwidth request code (dedicated BR code) through the dedicated resource (S430).

Accordingly, the base station allocates the uplink resource to the user equipment starting from a point at which the base station receives a BW indicator having the dedicated BR code after a pre-decided offset (S440). The offset may be decided during a service flow generation or modification (or correction) process or during a process of granting (or allocating) the dedicated resource.

The user equipment transmits data or a bandwidth request message to the base station through the allocated uplink resource (S450).

Hereinafter, a case when the base station notifies the resource allocation acceptance starting point to the user equipment through a MAC message will now be described with reference to FIG. 5 and FIG. 6.

Figure 5:
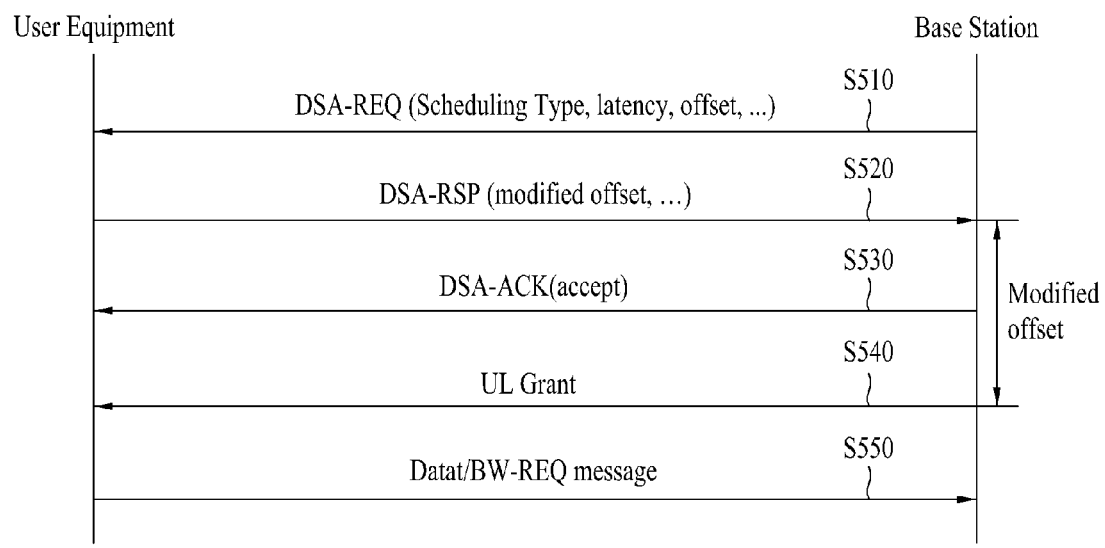
FIG. 5 illustrates a case when the base station transmits a resource grant acceptance starting point to the user equipment through a DSA-REQ message.
Figure 6:
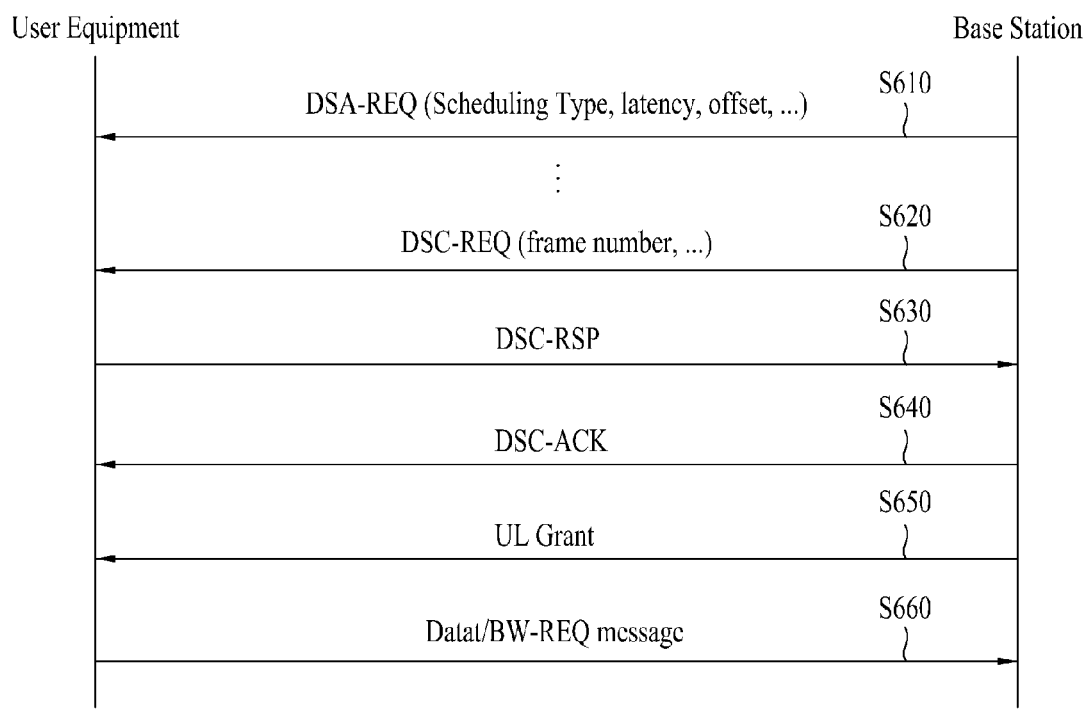
FIG. 6 illustrates a case when the base station transmits a resource grant acceptance starting point to the user equipment through a DSC-REQ message.

FIG. 5 illustrates a case when the base station transmits a resource allocation acceptance starting point to the user equipment through a DSA-REQ message, and FIG. 6 illustrates a case when the base station transmits a resource grant acceptance starting point to the user equipment through a DSC-REQ message.

As shown in FIG. 5, the base station transmits a DSA-REQ message to the user equipment in order to generate a service flow (S510). At this point, the DSA-REQ message includes a resource allocation acceptance starting point. Herein, the resource grant acceptance starting point may correspond to the form of an offset, a subframe number, a frame number, a superframe number, and so on.

FIG. 5 shows a case when the resource allocation acceptance starting time is transmitted by using an offset. When the base station transmits the resource allocation acceptance starting time by using an offset, the base station is notifying the user equipment that the base station will allocate the resource starting from a time point apart from the reference point as much as the offset.

The user equipment transmits a DSA-RSP message to the base station (S520). At this point, if the user equipment wishes to be granted with the resource starting from a time point other than the resource allocation acceptance starting point received from the base station, a modified offset, which corresponds to the newly requested resource allocation point, may be included in the DSA-RSP message so as to be transmitted.

The base station transmits a DSA-ACK message to the user equipment (S530). In case the base station is capable of allocating resource to the received modified offset, the DSA-ACK message, the DSA-ACK message includes a field indicating acceptance (accept), and, in case the base station is incapable of allocating resource to the received modified offset, the DSA-ACK message includes a field indicating rejection (reject).

In case the base station is capable of allocating resource to the modified offset, the base station allocate uplink resource to the user equipment starting from a time point apart from the point where the base station has received the modified offset from the user equipment as much as the modified offset (S540).

The user equipment transmits data or a bandwidth request message to the base station through the allocated uplink resource (S550).

FIG. 6 illustrates a case when the base station transmits a resource allocation acceptance starting point to the user equipment through a DSC-REQ message.

As shown in FIG. 6, the base station transmits a DSA-REQ message to the user equipment in order to generate a service flow (S610), then, after the service flow is generated, in case the service flow is required to be modified, the base station transmits a DSC-REQ message to the user equipment (S620). At this point, the DSC-REQ message includes a resource grant acceptance starting point. The resource allocation acceptance starting point may correspond to the form of an offset, a subframe number, a frame number, a superframe number, and so on. FIG. 6 shows a case when the resource allocation acceptance starting time is transmitted by using a frame number.

The user equipment transmits a DSC-RSP message to the base station as a response to the DSC-REQ message (S630), and the base station transmits a DSC-ACK message to the user equipment (S640).

Thereafter, the base station allocates an uplink resource to the frame number transmitted during the process step S620 (S650).

The user equipment transmits data or a bandwidth request message to the base station through the granted uplink resource (S660).

Hereinafter, if the base station is incapable of allocatng resource to the resource allocation request starting point received from the user equipment, a method performed by the base station for transmitting a resource allocation acceptance stating point, which corresponds to the time point at which the base station can allocate resource to the user equipment, to the user equipment will now be described in detail.

Figure 7:
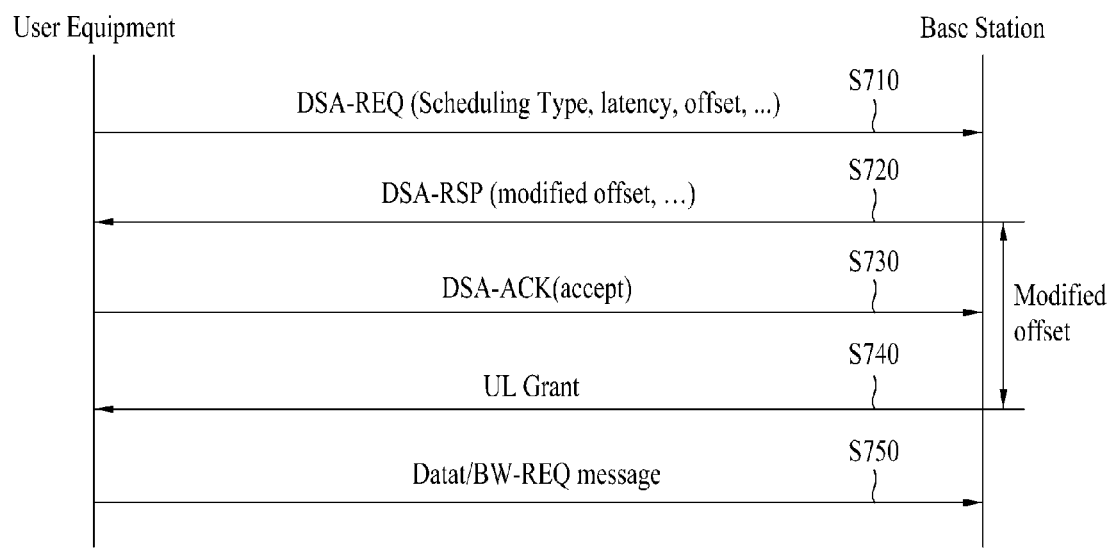
FIG. 7 illustrates a case when the base station transmits a resource grant acceptance starting point to the user equipment through a DSA-RSP message.

FIG. 7 illustrates a case when the base station transmits a resource allocation acceptance starting point to the user equipment through a DSA-RSP message.

In order to generate a service flow, the user equipment transmits a DSA-REQ message to the base station (S710). At this point, the DSA-REQ message includes a resource grant request starting point.

The base station transmits a DSA-RSP message to the user equipment as a response to the DSA-REQ message (S720). At this point, in case the base station is incapable of allocating a resource at the received resource allocation request starting time, the base station includes a resource grant acceptance starting time, which corresponds to a point at which the base station can allocate resource to the user equipment, in the DSA-RSP message and then transmitted. As shown in FIG. 7, the resource allocation acceptance starting point may have the form of a modified offset.

Alternatively, in case the base station is incapable of allocating a resource at the received resource grant request starting point, by including a reject indicator or an invalid value in the DSA-RSP message and transmitting the DSA-RSP message, the base station may notify the user equipment that the base station cannot allocate resource at the resource grant request starting point. Accordingly, the user equipment performs a contention based uplink resource grant process.

The user equipment notifies the base station whether to accept or to reject the resource allocation acceptance starting point, which is received from the base station (S730).

In case the grant is rejected, the base station does not allocate the resource to the user equipment at the resource allocation acceptance starting point, and, in case the grant is accepted, the base station allocates uplink resource to the user equipment at a time point apart from the point where the modified offset has been transmitted as much as the modified offset (S740).

The user equipment transmits data or a bandwidth request message to the base station through the allocated uplink resource (S750).

Figure 8:
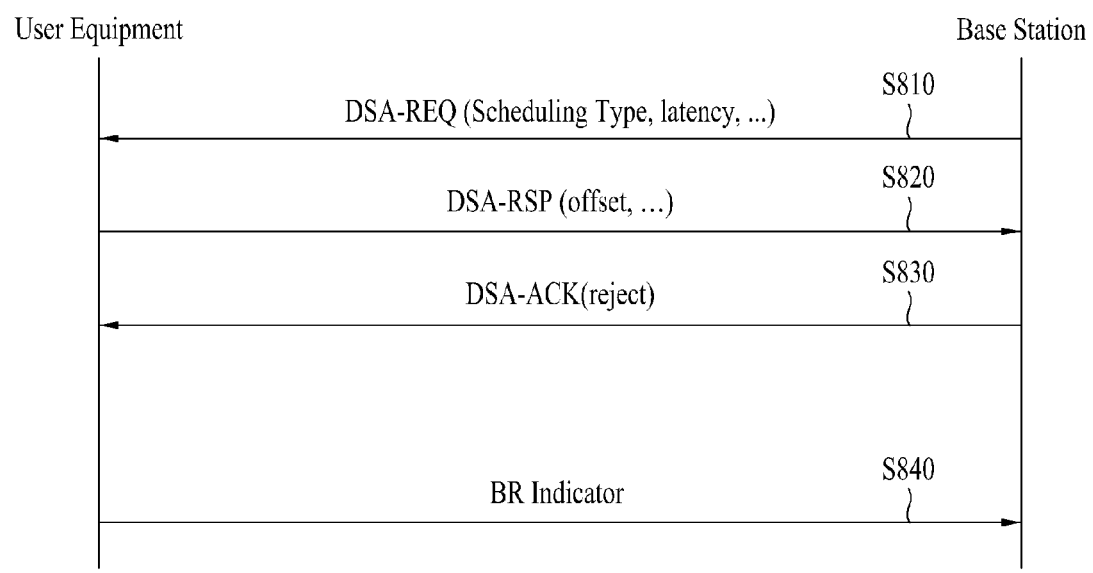
FIG. 8 illustrates a case when the base station notifies the user equipment that resource cannot be granted at the resource grant request starting point through a DSA-REQ message.

FIG. 8 illustrates a case when the base station notifies the user equipment that resource cannot be allocated at the resource allocation request starting point through a DSA-ACK message.

In order to generate a service flow, the base station transmits a DSA-REQ message to the user equipment (S810).

The user equipment transmits a DSA-RSP message to the base station as a response to the DSA-REQ message (S820). At this point, the DSA-RSP message may include a resource allocation request starting point.

The base station transmits a DSA-ACK message to the user equipment as an acknowledgement (or verification) response to the DSA-RSP message (S830). In case the base station is incapable of granting a resource at the received resource allocation request starting point, by including a resource allocation acceptance starting point, which corresponds to a point at which the base station is capable of allocating resource to the user equipment, in the DSA-ACK message and transmitting the DSA-ACK message, or by including a reject indicator or an invalid value in the DSA-RSP message and transmitting the DSA-RSP message, the base station may notify the user equipment that the base station cannot allocation resource at the resource allocation request starting point.

FIG. 8 shows a case when the base station notifies the user equipment that resource cannot be allocated at the grant request starting point through a DSA-ACK message.

Accordingly, the user equipment transmits a bandwidth indicator (BR indicator) to the base station in order to perform a contention based uplink resource allocation request process (S840).

Figure 9:
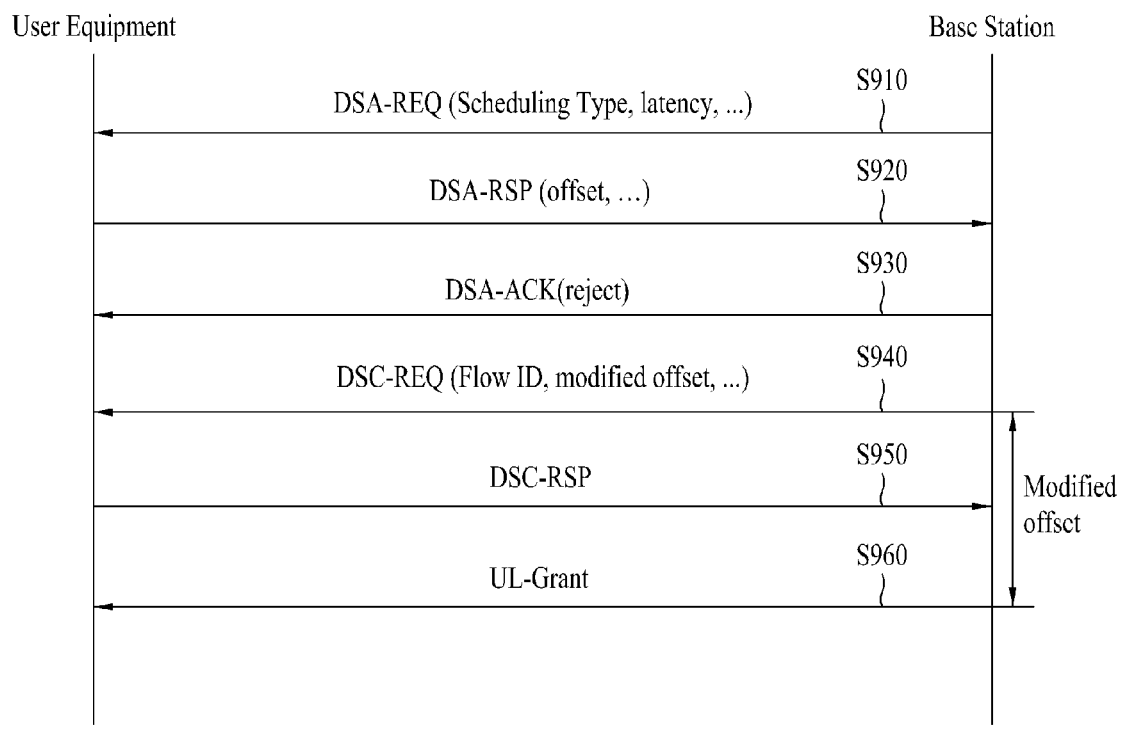
FIG. 9 illustrates a case when the base station transmits a resource grant acceptance starting point to the user equipment through a DSC-REQ message.

FIG. 9 illustrates a case when the base station transmits a resource allocation acceptance starting point to the user equipment through a DSC-REQ message.

In order to generate a service flow, the base station transmits a DSA-REQ message to the user equipment (S910).

The user equipment transmits a DSA-RSP message to the base station as a response to the DSA-REQ message (S920). At this point, the DSA-RSP message may include a resource request starting point.

The base station transmits a DSA-ACK message to the user equipment as an acknowledgement (or verification) response to the DSA-RSP message (S930). In case the base station is incapable of allocating a resource at the received resource allocation request starting point, by including a resource allocation acceptance starting point, which corresponds to a point at which the base station is capable of allocating resource to the user equipment, in the DSA-ACK message and transmitting the DSA-ACK message, or by including a reject indicator or an invalid value in the DSA-RSP message and transmitting the DSA-RSP message, the base station may notify the user equipment that the base station cannot allocate resource at the resource allocation request starting point. FIG. 9 shows a case when the base station notifies the user equipment that resource cannot be allocated at the allocation request starting point through a DSA-ACK message.

Subsequently, in order to modify the service flow, the base station transmits a DSC-REQ message to the user equipment (S940). At this point, the DSC-REQ message includes a resource grant acceptance starting point, which corresponds to a point at which the base station is capable of allocating resource to the user equipment. As shown in FIG. 9, the resource allocation acceptance starting point may have the form of a modified offset.

The user equipment transmits a DSC-RSP message to the base station as a response to the DSC-REQ message (S950).

Then, the base station grants an uplink resource to the user equipment at a time point apart as much as the modified offset from the transmission point of the modified offset (S960).

Figure 10:
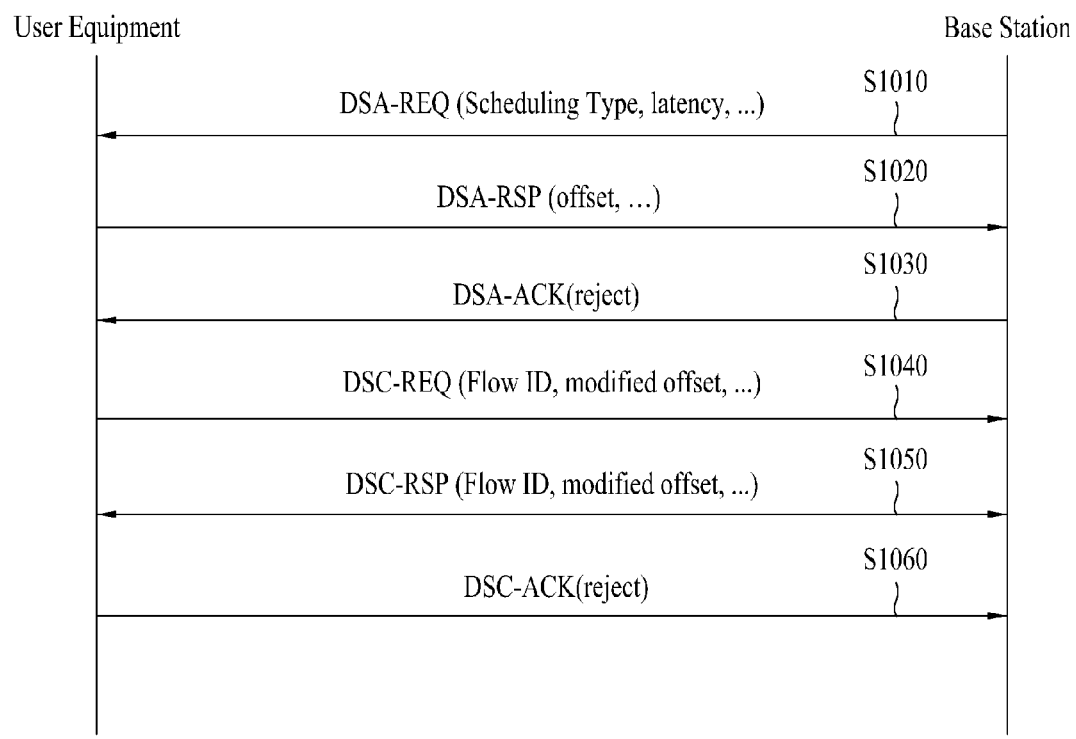
FIG. 10 illustrates a case when the base station transmits a resource grant acceptance starting point to the user equipment through a DSC-RSP message.

FIG. 10 illustrates a case when the base station transmits a resource allocation acceptance starting point to the user equipment through a DSC-RSP message.

In order to generate a service flow, the base station transmits a DSA-REQ message to the user equipment (S1010).

The user equipment transmits a DSA-RSP message to the base station as a response to the DSA-REQ message (S1020). At this point, the DSA-RSP message may include a resource allocation request starting point.

The base station transmits a DSA-ACK message to the user equipment as an acknowledgement (or verification) response to the DSA-RSP message (S1030). In case the base station is incapable of allocating a resource at the received resource allocation request starting point, by including a resource allocation acceptance starting point, which corresponds to a point at which the base station is capable of allocating resource to the user equipment, in the DSA-ACK message and transmitting the DSA-ACK message, or by including a reject indicator or an invalid value in the DSA-RSP message and transmitting the DSA-RSP message, the base station may notify the user equipment that the base station cannot allocate resource at the resource allocation request starting point. FIG. 10 shows a case when the base station notifies the user equipment that resource cannot be allocated at the allocation request starting point through a DSA-ACK message.

Subsequently, in order to modify the service flow, the user equipment transmits a DSC-REQ message to the base station (S1040). At this point, the DSC-REQ message may include a resource allocation request starting point.

The base station transmits a DSC-RSP message to the user equipment as a response to the DSC-REQ message (S1050). In case the base station is incapable of allocating resource to the user equipment, the base station includes a resource allocation acceptance starting point, which corresponds to a point at which the base station can allocate the resource to the user equipment, to the DSC-RSP message and transmits the DSC-RSP message.

Thereafter, the user equipment transmits a DSC-ACK message to the base station (S1060).

Figure 11:
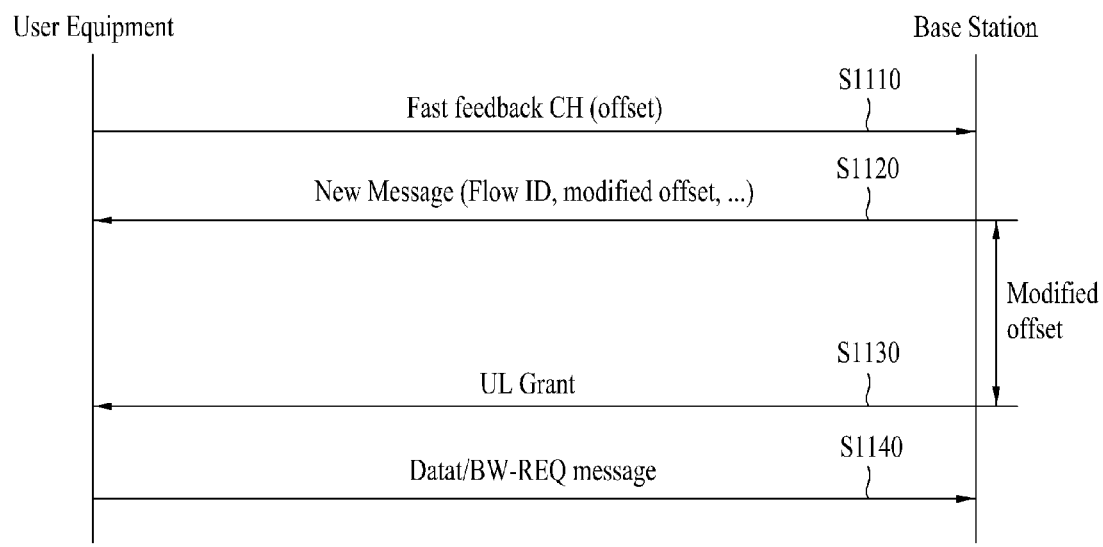
FIG. 11 illustrates a case when the base station transmits a resource grant acceptance starting point to the user equipment through a newly defined message.

FIG. 11 illustrates a case when the base station transmits a resource allocation acceptance starting point to the user equipment through a newly defined message.

As shown in FIG. 11, the user equipment transmits a resource allocation request starting point to the base station through a fast feedback channel (S1110), and, in case the base station is incapable of allocating resource to the resource allocation request starting point, the base station may include a resource allocation acceptance starting point, which corresponds to a point at which the base station is capable of allocating resource, in a newly defined message and may transmit the newly defined message. (S1120).

The base station grants an uplink resource to the user equipment at a time point apart as much as the modified offset from the transmission time point of the modified offset (S1130).

The user equipment transmits data or a bandwidth request message to the base station through the allocated uplink resource (S1140).

If the user equipment fails to be granted with a resource at the resource allocation request starting point requested by the user equipment or at the resource allocation acceptance starting point transmitted from the base station, the user equipment requests an uplink resource by using a contention based method.

Hereinafter, a case when the user equipment transmits an uplink data transmission indicator, a resource allocation request starting point, and a resource allocation request size will now be described in detail.

In case the data transmission indicator is 1, the user equipment may transmit a resource allocation request starting point and request size to the base station. And, the base station may transmit the received resource allocation request starting point and another resource allocation acceptance starting point to the user equipment.

The user equipment may transmit an uplink data transmission indicator, a resource allocation request starting point and request size to the base station through an extended header, which is transmitted along with the DSA-REQ message or the DSA-RSP message. At this point, since a flow ID respective to the corresponding service flow has not yet been acquired, a flow ID that is to be used for this purpose is defined in advance (or pre-defined). After receiving the extended header, which includes information such as the pre-defined flow ID and the request size, and the DSA-REQ message or DSA-RSP message, the base station recognizes that the user equipment is carrying the uplink data that are to be transmitted by using the corresponding service flow, and the base station considers a QoS parameter of a DSx message, thereby allocating an uplink resource to the user equipment.

Table 6 shows an extended header format when the extended header is transmitted during the service flow generation process.

TABLE 6

| Syntax | Size (bit) | Notes |
|---|---|---|
| Extended Header 1 ( ) { | | |
| LAST | 1 | Least Extended Header indication: 0 = one or more extended header follows the current extended header unless specified otherwise; 1 = this extended header is the last extended header unless specified otherwise |
| Type | | Type of extended header |
| Resource Allocation Starting Point | | In case the user equipment transmits the corresponding extended header, the corresponding field becomes a resource allocation request starting point. In case the Gaja- (base station) transmits the corresponding extended header, the corresponding field becomes a resource allocation acceptance starting point. |
| Resource Allocation Request Size | | The corresponding field is included only when the user equipment transmits the corresponding extended header. |

Table 7 shows an extended header format when the extended header is transmitted after the service flow generation process.

TABLE 7

| Syntax | Size (bit) | Notes |
|---|---|---|
| Extended Header 1 ( ) { | | |

TABLE 7-continued

| Syntax | Size (bit) | Notes |
| --- | --- | --- |
| LAST | 1 | Least Extended Header indication: 0 = one or more extended header follows the current extended header unless specified otherwise; 1 = this extended header is the last extended header unless specified otherwise |
| Type | | Type of extended header |
| Flow ID | | ID of a service flow wherein uplink data that are to be transmitted exist. |
| Resource Allocation Starting Point | | In case the user equipment transmits the corresponding extended header, the corresponding field becomes a resource allocation request starting point. In case the Gaja- (base station) transmits the corresponding extended header, the corresponding field becomes a resource allocationacceptance starting point. |
| Resource Allocation Request Size | | The corresponding field is included only when the user equipment transmits the corresponding extended header. |

Hereinafter, a case when the user equipment transmits an uplink data transmission indicator, a resource allocation request starting point and request size to the base station through a fast feedback channel.

Figure 12:
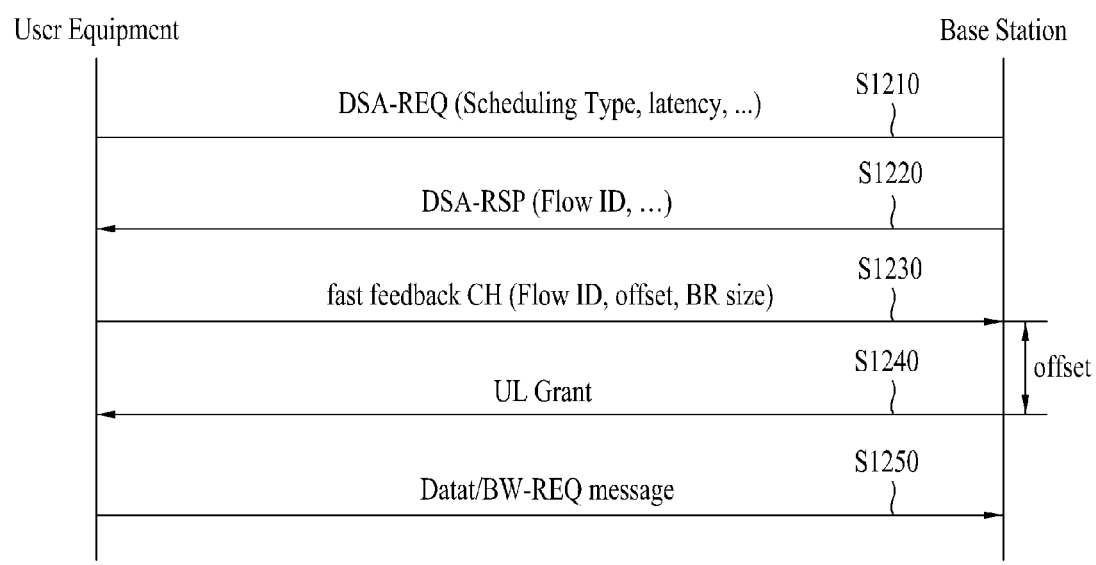
FIG. 12 illustrates a case when the user equipment transmits an uplink data transmission indicator, a resource grant request starting point, and a resource grant request size through a fast feedback channel.
Figure 13:
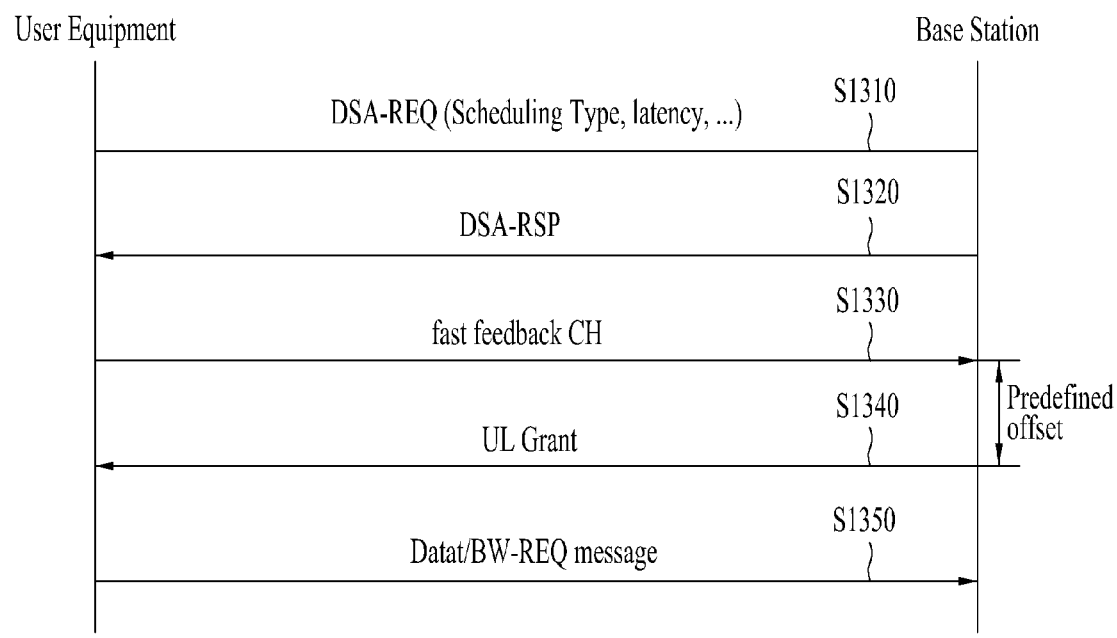
FIG. 13 illustrates a case when the user equipment notifies the base station of the presence of data that are to be transmitted by transmitting a pre-defined codeword through a fast feedback channel.

FIG. 12 illustrates a case when the user equipment transmits an uplink data transmission indicator, a resource allocation request starting point, and a resource allocation request size through a fast feedback channel. And, FIG. 13 illustrates a case when the user equipment notifies the base station of the presence of data that are to be transmitted by transmitting a pre-defined codeword through a fast feedback channel.

As shown in FIG. 12, in order to generate a service flow, the user equipment transmits a DSA-REQ message to the base station (S1210), and the base station transmits a DSA-RSP message to the user equipment as a response to the DSA-REQ message (S1220).

Subsequently, the user equipment transmits an uplink data transmission indicator, a resource allocation request starting point, and a resource allocation request size to the base station through a fast feedback channel (S1230). Since this corresponds to a method that is used when the uplink data exist, and since the uplink data transmission indicator implicitly indicates '1', the uplink data transmission indicator field may be omitted.

The resource allocation request starting point may be transmitted in the form of an offset, subframe number, frame number, or superframe number.

In case of the offset format, this indicates that an uplink resource allocation is requested to be performed at a time point apart as much as the offset from the point at which the fast feedback channel is received by the base station, and, in case of the subframe number, frame number, or superframe number format, this indicates that an uplink resource allocation is requested to be performed in the corresponding subframe, frame, or superframe.

The base station allocates an uplink resource at a time point apart as much as the received offset from the time point at which the fast feedback channel is received (S1240), and the user equipment transmits data or a bandwidth request message to the base station through the granted uplink resource (S1250).

FIG. 13 shows a case wherein, when an offset and request size is decided in advance, and when the user equipment transmits a specific codeword to the base station through a fast feedback channel, the base station recognizes that the user equipment requests for a resource allocation of a pre-decided request size at a time point apart as much as a pre-decided offset from the point at which the fast feedback channel is received.

As shown in FIG. 13, in order to generate a service flow, the user equipment transmits a DSA-REQ message to the base station (S1310), and the base station transmits a DSA-RSP message to the user equipment as a response to the DSA-REQ message (S1320).

Thereafter, the user equipment transmits a pre-defined codeword to the base station through the fast feedback channel (S1330). Accordingly, the base station recognizes that the user equipment has transmitted the pre-defined offset and request size. The offset and request size may be defined during the service flow generation or modification process or the step of granting a fast feedback channel.

Subsequently, the base station allocates a resource of a pre-decided request size to the user equipment at a time point apart as much as the pre-decided offset from the point at which the fast feedback channel is received (S1340), and the user equipment transmits data or a bandwidth request message to the base station through the allocated uplink resource (S1350).

Figure 14:
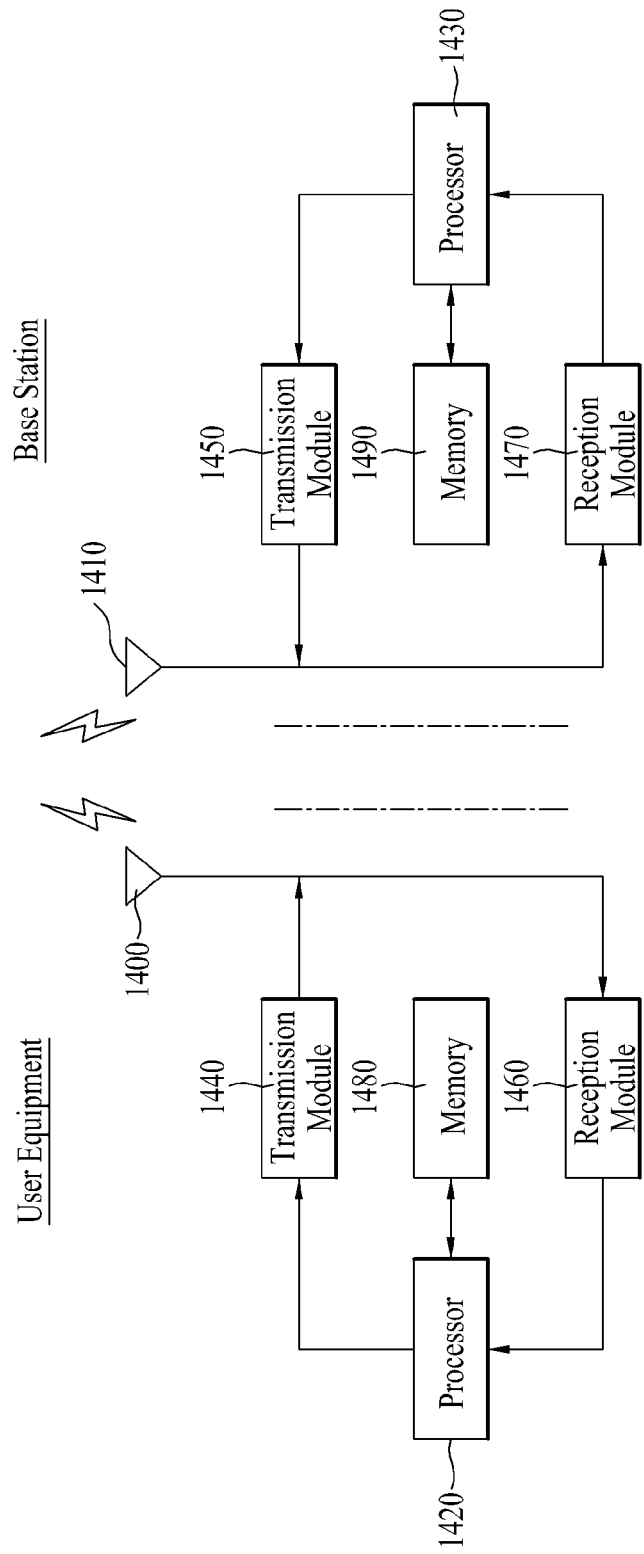
FIG. 14 illustrates structures of a mobile station and a base station wherein the above-described embodiments of the present invention can be realized, as another embodiment of the present invention.

FIG. 14 illustrates structures of a mobile station and a base station wherein the above-described embodiments of the present invention can be realized, as another embodiment of the present invention.

A mobile station (AMS) and a base station (ABS) each includes an antenna (1400, 1410) that can receive and transmit information, data, signals, and/or messages, a transmission module (Tx module) (1440, 1450) transmitting messages by controlling the antenna, a reception module (Rx module) (1460, 1470) receiving messages by controlling the antenna, a memory (1480, 1490) storing information associated with the communication with the base station, and a processor (1420, 143) controlling the transmission module, the reception module. At this point, the base station may correspond to a femto base station or a macro base station.

The antenna (1400, 1410) performs the function of transmitting a signal generated from the transmission module (1440, 1450) to the outside or performs the function of receiving a radio signal from an external source and delivering the received radio signal to the reception module (1460, 1470). In case a multiple antenna (MIMO) function is supported, 2 or more antennae may be provided.

The processor (1420, 1430) generally controls the overall operations of the mobile station or the base station. Most particularly, the processor may perform a control function for performing the above-described embodiments of the present invention, a MAC (Medium Access Control) frame variation control function respective to service characteristics and radio wave environment (or condition), a Hand Over function, authentication and encryption functions, and so on. Also, the processor (1420, 1430) may further include an encryption module that can control the encryption of various messages and a timer module controlling the reception and transmission of various messages.

The transmission module (1440, 1450) may perform a predetermined set of coding and modulation processes on a signal and/or data that is/are scheduled by the processor so as to be transmitted to the outside, thereby transmitting the processed signal and/or data to the antenna (1400, 1410).

The reception module (1460, 1470) performs decoding and demodulation on the radio signal, which is received through the antenna (1400, 1410) from the external source, thereby recovering the original data format, which is then transmitted to the processor (1420, 1430).

The memory (1480, 1490) may store a program for processing and controlling the processor, and the memory may also perform the function of temporarily storing inputted/outputted data (in case of a mobile station, an uplink grant (UL Grant) granted by the base station, system information, a station identifier (STID), a flow identifier (FID), an Action Time, area grant information, frame offset information, and so on).

The memory may include at least one of the storage medium types, the storage medium types being a flash memory type, a hard disk type, a multimedia card micro type, a card type memory (e.g., SD or XD memory, etc.), a RAM (Random Access Memory), an SRAM (Static Random Access Memory), a ROM (Read-Only Memory), an EEPROM (Electrically Erasable Programmable Read-Only Memory), a PROM (Programmable Read-Only Memory), a magnetic memory, a magnetic disk, and an optical disk.

As described above, the detailed description of the preferred embodiments of the present invention, which is disclosed herein, is provided to enable anyone skilled in the art to realize and perform the embodiment of the present invention. Although the description of the present invention is described with reference to the preferred embodiments of the present invention, it will be apparent that anyone skilled in the art may be capable of diversely modifying and varying the present invention without deviating from the technical scope and spirit of the present invention. For example, anyone skilled in the art may use the elements disclosed in the above-described embodiments of the present invention by diversely combining each of the elements.

Accordingly, the present invention will not be limited only to the embodiments presented herein. Instead, the present invention seeks to provide a broader technical scope that conforms to the principles disclosed herein and also to novel characteristics.

INDUSTRIAL APPLICABILITY

The method for transmitting and receiving service flow information according to the embodiment of the present invention may be industrially used in mobile communication systems or in the wireless communication industry.

What is claimed is:

1. A method of transmitting service flow information at a mobile station (MS) in a wireless communication system, the method comprising:
transmitting an indicator to a base station (BS) during a process of generating or modifying a service flow, the indicator indicating whether or not uplink data that are to be transmitted through a service flow, which is to be generated or modified, exist; and
transmitting a resource allocation request starting point that corresponds to a point at which the MS requests the BS for a resource grant when the indicator indicates that uplink data that are to be transmitted through the service flow, which is to be generated or modified, exist.

2. The method of claim 1, wherein the indicator and the resource allocation request starting point are transmitted through a MAC message, the MAC message being transmitted during the process of generating or modifying a service flow.

3. The method of claim 2, wherein the MAC message further includes a size of the resource requested by the MS.

4. The method of claim 1, wherein the resource allocation request starting point corresponds to an offset starting from a specific reference point to a point at which the MS requests for a resource allocation.

5. The method of claim 4, further comprising:
being allocated with an uplink resource from the BS at a time point apart from the specific reference point as much as the offset.

6. The method of claim 1, wherein the resource allocation request starting point corresponds to a subframe, frame, or superframe number to which the MS requests for the resource allocation.

7. The method of claim 1, further comprising:
receiving a resource allocation acceptance starting point, which corresponds to a time point at which the BS is capable of allocating resource to the MS when the BS is incapable of allocating a resource to the MS at the resource allocating request starting point.

8. A method of receiving service flow information at a base station (BS) in a wireless communication system, the method comprising:
receiving an indicator from a mobile station (MS) during a process of generating or modifying a service flow, the indicator indicating whether or not uplink data that are to be transmitted through a service flow, which is to be generated or modified, exist, and a resource grant request starting point, which corresponds to a point where the user equipment requests the base station for a resource grant.

9. The method of claim 8, further comprising:
receiving a resource allocation acceptance starting point, which corresponds to a time point at which the BS is capable of allocating resource to the MS when the BS is incapable of allocating a resource to the MS at the resource allocation request starting point.

* * * * *